US012810524B2

(12) United States Patent
Chen

(10) Patent No.: US 12,810,524 B2
(45) Date of Patent: Nov. 24, 2026

(54) CLOUD TECHNOLOGY-BASED GRAPHIC RENDERING SYSTEM AND METHOD, AND MANAGEMENT PLATFORM

(71) Applicant: Huawei Cloud Computing Technologies Co., Ltd., Guizhou (CN)

(72) Inventor: Pu Chen, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 194 days.

(21) Appl. No.: 18/770,873

(22) Filed: Jul. 12, 2024

(65) Prior Publication Data

US 2024/0362850 A1 Oct. 31, 2024

Related U.S. Application Data

(63) Continuation of application No. PCT/CN2022/106603, filed on Jul. 20, 2022.

(30) Foreign Application Priority Data

Jan. 13, 2022 (CN) ......................... 202210037274.2

(51) Int. Cl.
*G06T 15/00* (2011.01)
*H04L 67/10* (2022.01)

(52) U.S. Cl.
CPC ............ *G06T 15/005* (2013.01); *H04L 67/10* (2013.01)

(58) Field of Classification Search
CPC ....... G06T 15/005; G06T 15/00; H04L 67/10; G06Q 20/123; G06Q 30/06
See application file for complete search history.

(56) References Cited

U.S. PATENT DOCUMENTS 6,384,821 B1 * 5/2002 Borrel ...................... H04L 65/80 375/E7.012
2008/0111816 A1 * 5/2008 Abraham ............... G06Q 30/06 345/420

(Continued)

FOREIGN PATENT DOCUMENTS

CN 103281345 A 9/2013
CN 108733685 A * 11/2018 ......... G06Q 30/0625

(Continued)

OTHER PUBLICATIONS

Dante Abate et al:"Remote Rendering and Visualization of Large Textured 3D Models",Sep. 2, 2012 (Sep. 2, 2012), pp. 399-404, XP032275750.

*Primary Examiner* — Haixia Du
(74) *Attorney, Agent, or Firm* — Conley Rose, P.C.

(57) ABSTRACT

A cloud management platform is configured to: receive a graphic asset uploaded by at least one of a plurality of asset providers; receive payment success information of at least one of a plurality of asset users for the graphic asset, and record that the at least one asset user has permission to use the graphic asset; receive a rendering request that is for the graphic asset and that is sent by the at least one asset user, and request the graphic asset from the cloud management platform in response to the rendering request; when determining that the at least one asset user has the permission to use the graphic asset, send the graphic asset to the rendering unit; render the first graphic asset to generate a rendering result, and send the rendering result to the at least one asset user.

20 Claims, 6 Drawing Sheets

TO FIG. 3B
TO FIG. 3B

(56) References Cited

U.S. PATENT DOCUMENTS

| | | | |
|---|---|---|---|
| 2014/0267339 A1 | 9/2014 | Dowd et al. | |
| 2022/0060572 A1* | 2/2022 | Kwon | H04M 1/0243 |
| 2024/0226729 A1* | 7/2024 | Dietrich, Jr. | G06T 7/20 |

FOREIGN PATENT DOCUMENTS

| | | | |
|---|---|---|---|
| CN | 110557624 A | | 12/2019 |
| CN | 111084983 A | | 5/2020 |
| CN | 111614780 A | | 9/2020 |
| CN | 112184872 A | | 1/2021 |
| JP | 2004145523 A | * | 5/2004 |

* cited by examiner

CLOUD TECHNOLOGY-BASED GRAPHIC RENDERING SYSTEM AND METHOD, AND MANAGEMENT PLATFORM

CROSS-REFERENCE TO RELATED APPLICATIONS

This is a continuation of International Patent Application No. PCT/CN2022/106603 filed on Jul. 20, 2022, which claims priority to Chinese Patent Application No. 202210037274.2 filed on Jan. 13, 2022. The disclosures of the aforementioned applications are hereby incorporated by reference in their entireties.

TECHNICAL FIELD

This application relates to the data processing field, and in particular, to a cloud technology-based graphic rendering system and method, and a management platform.

BACKGROUND

Graphic rendering is a technology used to convert three-dimensional (3D) light energy into a two-dimensional (2D) image through transferring and processing, and is generally applied to industries such as game production, film production, architectural design, home design, and industrial design.

Before graphic rendering, a 3D model needs to be built. Building the 3D model is also referred to as modeling, and is to build a three-dimensional entity or scenario by using elements such as points, lines, surfaces, maps, and materials. The built three-dimensional entity may be referred to as a three-dimensional model, and the built scenario is three-dimensional space including one or more three-dimensional models.

The modeling consumes time and energy of designers. The 3D model or scenario obtained through the modeling is a labor achievement of the designers and is a valuable asset. The 3D model or scenario can be copied and are easily distributed illegally, causing damage to the labor achievement of the designers.

SUMMARY

Embodiments of this application provide a cloud technology-based graphic rendering system and method, and a management platform, to protect a graphic asset.

According to a first aspect, a cloud technology-based graphic rendering system is provided. The system includes a cloud management platform and a rendering unit that are disposed in a cloud data center, and the cloud management platform is configured to provide a login interface for a plurality of off-cloud asset providers and a plurality of off-cloud asset users to remotely log in to the cloud management platform by using different accounts, where the cloud management platform is configured to: receive a first graphic asset uploaded by at least one of the plurality of asset providers, set the first graphic asset to be tradable, configure a price for the first graphic asset, and publicly display introduction information and the price of the first graphic asset on the internet; the cloud management platform is configured to: receive payment success information of at least one of the plurality of asset users for the first graphic asset, and record, based on the payment success information, that the at least one asset user has permission to use the first graphic asset; the rendering unit is configured to: receive a rendering request that is for the first graphic asset and that is sent by the at least one asset user, and request the first graphic asset from the cloud management platform in response to the rendering request; the cloud management platform is configured to: when determining that the at least one asset user has the permission to use the first graphic asset, send the first graphic asset to the rendering unit; and the rendering unit is configured to: render the first graphic asset to generate a first rendering result, and send the first rendering result to the at least one asset user.

In this system, the asset provider can upload the graphic asset to the cloud management platform, and the asset user can obtain the permission to use the graphic asset through paying for the asset. In this way, the asset user can use the graphic asset, and the asset provider can also obtain a corresponding reward. In addition, when the asset user uses the graphic asset, the cloud rendering unit renders the graphic asset, so that a rendering requirement of the user is met without sending the graphic asset or a copy of the graphic asset to the asset user. This avoids illegal distribution of the graphic asset and further avoids damage to an asset of a graphic asset owner.

In a possible implementation, the rendering unit is configured to: obtain, from the at least one asset user, a setting parameter of a model or scenario related to the first graphic asset, generate depth information of the first rendering result based on the setting parameter, and send the depth information to the at least one asset user, where the at least one asset user fuses the first rendering result into a local model or scenario based on the depth information.

In this implementation, the cloud rendering unit may send the depth information of the first rendering result to the asset user, so that the asset user can fuse the first rendering result and a local rendering result based on the depth information. This improves a fusion effect.

In a possible implementation, the setting parameter includes one or any combination of a location and an orientation of the model or scenario related to the first graphic asset in world coordinates, a light source location, and a location and an orientation of a camera.

In a possible implementation, the rendering unit is configured to: obtain a local graphic asset from the at least one asset user, and render the local graphic asset while rendering the first graphic asset to generate the first rendering result, to generate a second rendering result; and the rendering unit is configured to: fuse the second rendering result and the first rendering result, and send a fused rendering result to the at least one asset user.

In other words, in this implementation, the asset user may also hand over the local graphic asset to the cloud rendering unit for rendering, so that a performance requirement on a local apparatus of the asset user is reduced, and the asset user can use a lightweight local apparatus to obtain the rendering result of the graphic asset.

In a possible implementation, the cloud management platform stores a preset third-party graphic asset, and the rendering request is further for requesting to render the third-party graphic asset, so that the rendering unit further requests the third-party graphic asset from the cloud management platform while requesting the first graphic asset from the cloud management platform; the cloud management platform is configured to send the third-party graphic asset to the rendering unit while sending the first graphic asset to the rendering unit; the rendering unit is configured to render the first graphic asset and the third-party graphic asset to generate a third rendering result; and the rendering unit is configured to send the third rendering result to the at least one asset user.

In other words, in this implementation, the asset user may render graphic assets from different asset providers while requesting the cloud rendering unit. This expands a range in which the asset user can use the graphic assets.

In a possible implementation, the payment success information records identification information of the first graphic asset, and the rendering request carries the identification information of the first graphic asset; and the rendering unit is configured to request, from the cloud management platform, a graphic asset corresponding to the identification information carried in the rendering request.

In other words, in this implementation, after purchasing the graphic asset, the asset user may obtain the identification information of the purchased graphic asset, and add the identification information to the rendering request, so that the rendering unit may request the corresponding graphic asset from the cloud management platform based on the identification information.

In a possible implementation, the cloud management platform is configured to receive the first graphic asset and a low-definition version of the first graphic asset that are uploaded by the at least one of the plurality of asset providers; the cloud management platform is configured to receive a preview request that is for the first graphic asset and that is sent by the at least one asset user; and the cloud management platform is configured to send the low-definition version of the first graphic asset to the at least one asset user.

In other words, in this implementation, the cloud management platform may provide the graphic asset of the low-definition version for the asset user, so that the asset user can use the graphic asset of the low-definition version to preview a rendering effect of the graphic asset. This protects the graphic asset and improves use experience of the asset user.

In a possible implementation, the first graphic asset is a graphic model, and the first graphic model includes geometry information, material information, and texture information.

In other words, in the method, while a rendering requirement of the asset user for the graphic model is met, and the graphic asset of the graphic model is protected. This avoids the illegal distribution of the graphic asset and further avoids the damage to the asset of the graphic asset owner.

In a possible implementation, the first graphic asset is a graphic scenario, and the graphic scenario includes at least one graphic model and light source information and/or camera information.

In other words, in the method, while a rendering requirement of the asset user for the graphic scenario is met, the graphic asset of the graphic scenario is protected. This avoids the illegal distribution of the graphic asset and further avoids the damage to the asset of the graphic asset owner.

According to a second aspect, a cloud technology-based graphic rendering method is provided. The method is applied to a cloud management platform in a graphic rendering system, the graphic rendering system further includes a rendering unit, the cloud management platform and the rendering unit are disposed in a cloud data center, and the method includes: The cloud management platform provides a login interface for a plurality of off-cloud asset providers and a plurality of off-cloud asset users to remotely log in to the cloud management platform by using different accounts; the cloud management platform receives a first graphic asset uploaded by at least one of the plurality of asset providers, sets the first graphic asset to be tradable, configures a price for the first graphic asset, and publicly displays introduction information and the price of the first graphic asset on the internet; the cloud management platform receives payment success information of at least one of the plurality of asset users for the first graphic asset, and records, based on the payment success information, that the at least one asset user has permission to use the first graphic asset; the cloud management platform receives an obtaining request for the first graphic asset from the rendering unit, where the obtaining request for the first graphic asset is sent by the rendering unit in response to a rendering request that is for the first graphic asset and that is sent by the at least one asset user; and when determining that the at least one asset user has the permission to use the first graphic asset, the cloud management platform sends the first graphic asset to the rendering unit, so that the rendering unit renders the first graphic asset to generate a first rendering result, and sends the first rendering result to the at least one asset user.

In a possible implementation, the cloud management platform stores a preset third-party graphic asset, the rendering request is further for requesting to render the third-party graphic asset, and the obtaining request for the first graphic asset is further for requesting the third-party graphic asset; and sending the first graphic asset to the rendering unit includes: The cloud management platform sends the first graphic asset and the third-party graphic asset to the rendering unit, so that the first graphic asset and the third-party graphic asset are rendered to generate a third rendering result, and the third rendering result is sent to the at least one asset user.

In a possible implementation, the payment success information records identification information of the first graphic asset, and the obtaining request for the first graphic asset carries the identification information; and the sending the first graphic asset to the rendering unit includes: The cloud management platform sends a graphic asset corresponding to the identification information to the rendering unit.

In a possible implementation, the method further includes: The cloud management platform receives the first graphic asset and a low-definition version of the first graphic asset that are uploaded by the at least one of the plurality of asset providers; the cloud management platform receives a preview request that is for the first graphic asset and that is sent by the at least one asset user; and the cloud management platform sends the low-definition version of the first graphic asset to the at least one asset user.

In a possible implementation, the first graphic asset is a graphic model, and the first graphic model includes geometry information, material information, and texture information.

In a possible implementation, the first graphic asset is a graphic scenario, and the graphic scenario includes at least one graphic model and light source information and/or camera information.

According to a third aspect, a cloud management platform is provided. The cloud management platform belongs to a graphic rendering system, the graphic rendering system further includes a rendering unit, and the cloud management platform and the rendering unit are disposed in a cloud data center; and the cloud management platform includes: a providing unit, configured to provide a login interface for a plurality of off-cloud asset providers and a plurality of off-cloud asset users to remotely log in to the cloud management platform by using different accounts; a first receiving unit, configured to: receive a first graphic asset uploaded by at least one of the plurality of asset providers, set the first graphic asset to be tradable, configure a price for the first graphic asset, and publicly display introduction information and the price of the first graphic asset on the internet; a second receiving unit, configured to: receive payment success information of at least one of the plurality of asset users for the first graphic asset, and record, based on the payment success information, that the at least one asset user has permission to use the first graphic asset; a third receiving unit, configured to receive an obtaining request for the first graphic asset from the rendering unit, where the obtaining request for the first graphic asset is sent by the rendering unit in response to a rendering request that is for the first graphic asset and that is sent by the at least one asset user; and a sending unit, configured to: when determining that the at least one asset user has the permission to use the first graphic asset, send the first graphic asset to the rendering unit, so that the rendering unit renders the first graphic asset to generate a first rendering result, and sends the first rendering result to the at least one asset user.

In a possible implementation, the cloud management platform further includes a storage unit, configured to store a preset third-party graphic asset, the rendering request is further for requesting to render the third-party graphic asset, and the obtaining request for the first graphic asset is further for requesting the third-party graphic asset; and the sending unit is further configured to send the first graphic asset and the third-party graphic asset to the rendering unit, so that the first graphic asset and the third graphic asset are rendered to generate a third rendering result, and the third rendering result is sent to the at least one asset user.

In a possible implementation, the payment success information records identification information of the first graphic asset, and the obtaining request for the first graphic asset carries the identification information; and the sending unit is further configured to send a graphic asset corresponding to the identification information to the rendering unit.

In a possible implementation, the first receiving unit is further configured to receive the first graphic asset and a low-definition version of the first graphic asset that are uploaded by the at least one of the plurality of asset providers; the second receiving unit is further configured to receive a preview request that is for the first graphic asset and that is sent by the at least one asset user; and the sending unit is further configured to send the low-definition version of the first graphic asset to the at least one asset user.

In a possible implementation, the first graphic asset is a graphic model, and the first graphic model includes geometry information, material information, and texture information.

In a possible implementation, the first graphic asset is a graphic scenario, and the graphic scenario includes at least one graphic model and light source information and/or camera information.

According to a fourth aspect, a cloud management platform is provided, including a processor and a memory. The processor is configured to execute instructions stored in the memory, to perform the method according to the second aspect.

According to a fifth aspect, a computer-readable storage medium is provided, including computer program instructions. When the computer program instructions are executed by a computing device cluster, the computing device cluster performs the method according to the second aspect.

According to a sixth aspect, a computer program product including instructions is provided. When the instructions are run by a computer device cluster, the computer device cluster is enabled to perform the method according to the second aspect.

In the solution provided in this application, the asset provider can upload the graphic asset to the cloud management platform, and the asset user can obtain the permission to use the graphic asset through paying for the asset. In this way, the asset user can use the graphic asset, and the asset provider can also obtain the corresponding reward. In addition, when the asset user uses the graphic asset, the cloud rendering unit renders the graphic asset, so that the rendering requirement of the user is met without sending the graphic asset or the copy of the graphic asset to the asset user. This avoids the illegal distribution of the graphic asset and further avoids the damage to the asset of the graphic asset owner.

DESCRIPTION OF EMBODIMENTS

Figure 1:
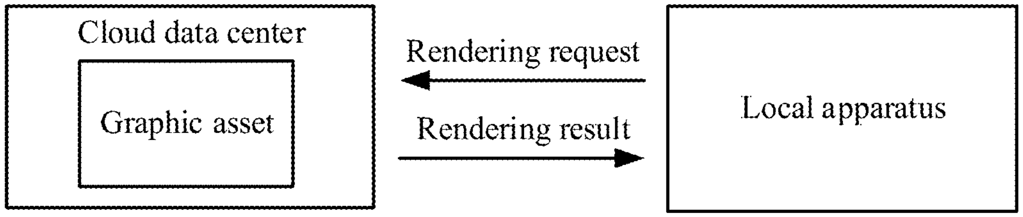
FIG. 1 is a diagram of a structure of a cloud technology-based graphic rendering system according to an embodiment of this application.

The following describes technical solutions in embodiments of the present disclosure with reference to accompanying drawings. It is clear that the described embodiments are merely some rather than all of embodiments of this specification.

In the descriptions of this specification, "an embodiment", "some embodiments", or the like indicates that one or more embodiments of this specification include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this specification, "a plurality of" means two or more than two.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "include", "comprise", "have", and their variants all mean "include but are not limited to", unless otherwise specifically emphasized in another manner.

In graphic rendering, for a three-dimensional scenario, geometric transformation, projection transformation, perspective transformation, window cropping, and the like are performed, and then material data and lighting data are obtained, to generate an image and complete rendering. The three-dimensional scenario is three-dimensional space including one or more three-dimensional models. Therefore, before the graphic rendering is performed, a three-dimensional model may need to be obtained first, and after an operation and/or transformation is performed on the model to obtain a three-dimensional scenario, graphic rendering is performed on the three-dimensional scenario; or a three-dimensional scenario is directly obtained, and graphic rendering is performed on the three-dimensional scenario.

Obtaining the three-dimensional model is to obtain graphic data for describing the three-dimensional model. The graphic data may also be referred to as a graphic model, and may include geometry information, material information, texture information, and the like. The graphic data of the three-dimensional model is a labor achievement of a designer and a valuable asset. After the graphic data of the three-dimensional model is obtained, the three-dimensional model may be obtained through running the graphic data by a computer.

Obtaining the three-dimensional scenario is to obtain scenario data for describing the scenario. The scenario data may also be referred to as a graphic scenario, and may include at least one of one or more graphic models, light source information, and camera information. The light source information may include any one or more of a type, an orientation, and a location of a light source. The camera information includes any one or more of a type, an orientation, and a location of a camera. The scenario data of the scenario can be a labor achievement of a designer and is a valuable asset. After the scenario data of the scenario is obtained, the three-dimensional scenario may be obtained through running the scenario data by a computer.

As described above, both the graphic data of the three-dimensional model and the scenario data of the scenario are valuable assets, and may be referred to as graphic assets. In addition, in the following descriptions, when the graphic data of the three-dimensional model and the scenario data of the scenario are not specially distinguished, the graphic data of the three-dimensional model and the scenario data of the scenario may be referred to as graphic assets for short.

For a user having a graphic rendering requirement, a way of obtaining a three-dimensional model or a three-dimensional scenario is to build the three-dimensional model or scenario by himself/herself. This way may need much time and energy.

Another way of obtaining a three-dimensional model or a three-dimensional scenario is to obtain a corresponding graphic asset in a transaction manner. Currently, a specific method of obtaining the graphic asset in the transaction manner is: In a transaction between an asset provider and an asset user, the asset provider copies the graphic asset to the asset user, so that the asset user obtains the three-dimensional model or the three-dimensional scenario. In this way, the graphic asset is easily distributed without consent of a legal owner of the graphic asset, and the asset of the legal owner is damaged.

Refer to FIG. 1. An embodiment of this application provides a cloud technology-based graphic rendering solution. A graphic asset may be stored in a cloud computing data center, and the graphic asset corresponds to preset use permission. When a user (an asset user) uses the graphic asset to render a three-dimensional model or a three-dimensional scenario corresponding to the graphic asset, a rendering request may be sent to the cloud data center by using a local apparatus. The cloud data center may determine whether the user has the use permission of an image asset. When the user has the use permission of the graphic asset, the three-dimensional model or the three-dimensional scenario is rendered by using the graphic asset, to obtain a rendering result. Then, the rendering result is sent to the local apparatus. The rendering result is a rendered image that is for displaying the three-dimensional model or the three-dimensional scenario. Therefore, when a requirement of the asset user for the three-dimensional model or the three-dimensional scenario is met, the graphic asset does not need to be copied to the asset user for rendering, so that the graphic asset is protected. This avoids illegal distribution of the graphic asset and further avoids damage to the asset of a graphic asset owner.

The cloud computing data center may also be referred to as the cloud data center for short.

Next, in different embodiments, the graphic rendering solution provided in this embodiment of this application is described by using an example.

Figure 2:
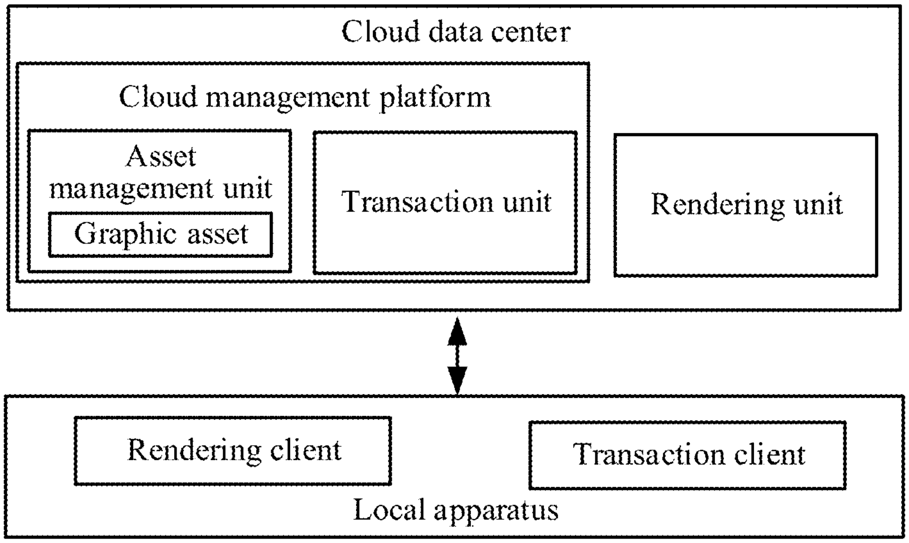
FIG. 2 is a diagram of a structure of a cloud technology-based graphic rendering system according to an embodiment of this application.

FIG. 2 shows a graphic rendering system according to an embodiment of this application. The graphic rendering system may be configured to implement the graphic rendering solution provided in embodiments of this application. As shown in FIG. 2, the graphic rendering system may include a cloud management platform, a rendering unit, and a local apparatus. The cloud management platform and the rendering unit are disposed in a cloud data center. For example, the cloud management platform may include an asset management unit and a transaction unit. The local apparatus may include a rendering client and a transaction client.

In comparison with the local apparatus, the cloud data center may be an apparatus or a device deployed on a cloud.

In some embodiments, the cloud management platform or the rendering unit may be one or more computing nodes in the cloud data center, and the asset management unit and the transaction unit may be different computing nodes or may be a same computing node.

In some embodiments, the cloud management platform or the rendering unit may be a virtual device deployed on a physical machine in the data center. In an example, the cloud management platform or the rendering unit may be formed by at least one virtual machine (VM). The asset management unit in the cloud management platform may be one or more virtual machines, and the transaction unit may be one or more other virtual machines. Alternatively, the asset management unit and the transaction unit may be different functional modules in a same virtual machine. In another example, the cloud management platform or the rendering unit may be formed by at least one container. The asset management unit in the cloud management platform may be one or more containers, and the transaction unit may be one or more other containers. Alternatively, the asset management unit and the transaction unit may be different functional modules in a same container. The physical machine in the data center may provide a hardware environment for running of the virtual device. For example, the physical machine may include one or more memories and one or more processors. The asset management unit in the cloud management platform may use a storage resource provided by the one or more memories to store a graphic asset and the like. The rendering unit may invoke the graphic asset from the memory by using a computing resource provided by the one or more processors, and perform rendering by using the graphic asset. In some embodiments, the one or more processors may include a processor having a graphic rendering capability, such as a graphics processing unit (GPU) or an artificial intelligence (AI) chip. The physical machine may further include a communication module, so that the cloud management platform and the rendering unit may exchange information with the local apparatus by using the communication module, for example, receive a rendering request and send a rendering result.

The local apparatus may also be referred to as a terminal apparatus, and is an apparatus or a device deployed on a user side.

In some embodiments, the local apparatus may be configured on a virtual device of a terminal device. The terminal device may be a mobile phone, a tablet computer, a personal computer (PC), an intelligent wearable device, a smart television, an in-vehicle terminal, or the like. The terminal device may provide a hardware environment for running of the local apparatus. The transaction client and the rendering client in the local apparatus may be different applications or processes running in a local device.

In some embodiments, the local apparatus may be implemented as the terminal device. For example, the terminal apparatus may be implemented as a mobile phone, a tablet computer, a personal computer, an intelligent wearable device, a smart television, an in-vehicle terminal, or the like. For example, the transaction client and the rendering client in the local apparatus may be different applications or processes running in the local apparatus. For example, the local apparatus may include different terminal devices, and the transaction client and the rendering client in the local apparatus may be different terminal devices.

The foregoing example describes implementations of the cloud management platform, the rendering unit, the local apparatus, and the functional units in the cloud management platform, the rendering unit, and the local apparatus. It should be noted that the foregoing descriptions are merely examples, and are not limited. In other embodiments, the cloud management platform, the rendering unit, the local apparatus, and the functional units in the cloud management platform, the rendering unit, and the local apparatus may also be implemented in other forms, and details are not described herein again.

Figure 3A:
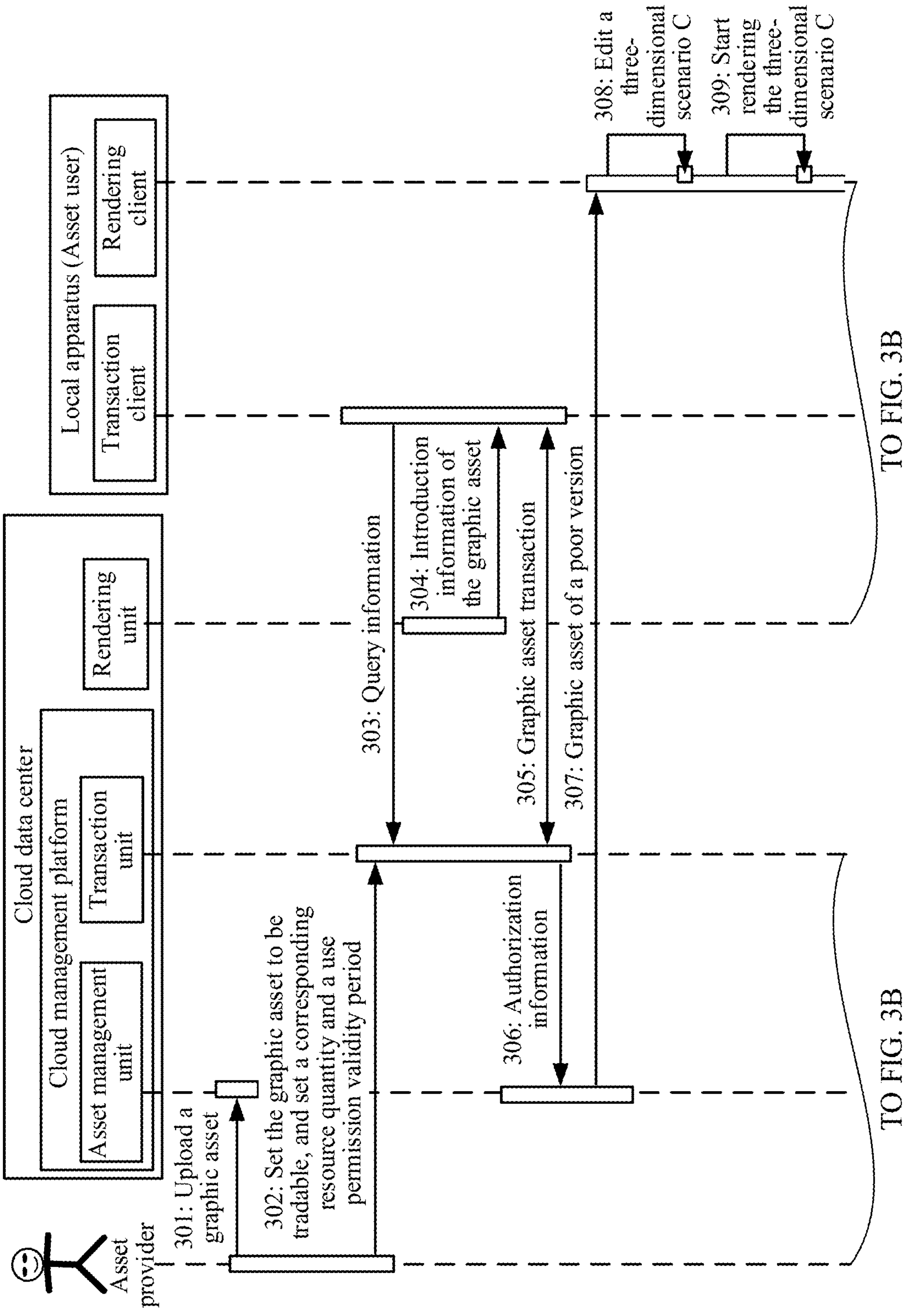
FIG. 3A and FIG. 3B are a flowchart of a graphic rendering method using a cloud technology according to an embodiment of this application.
Figure 3B:
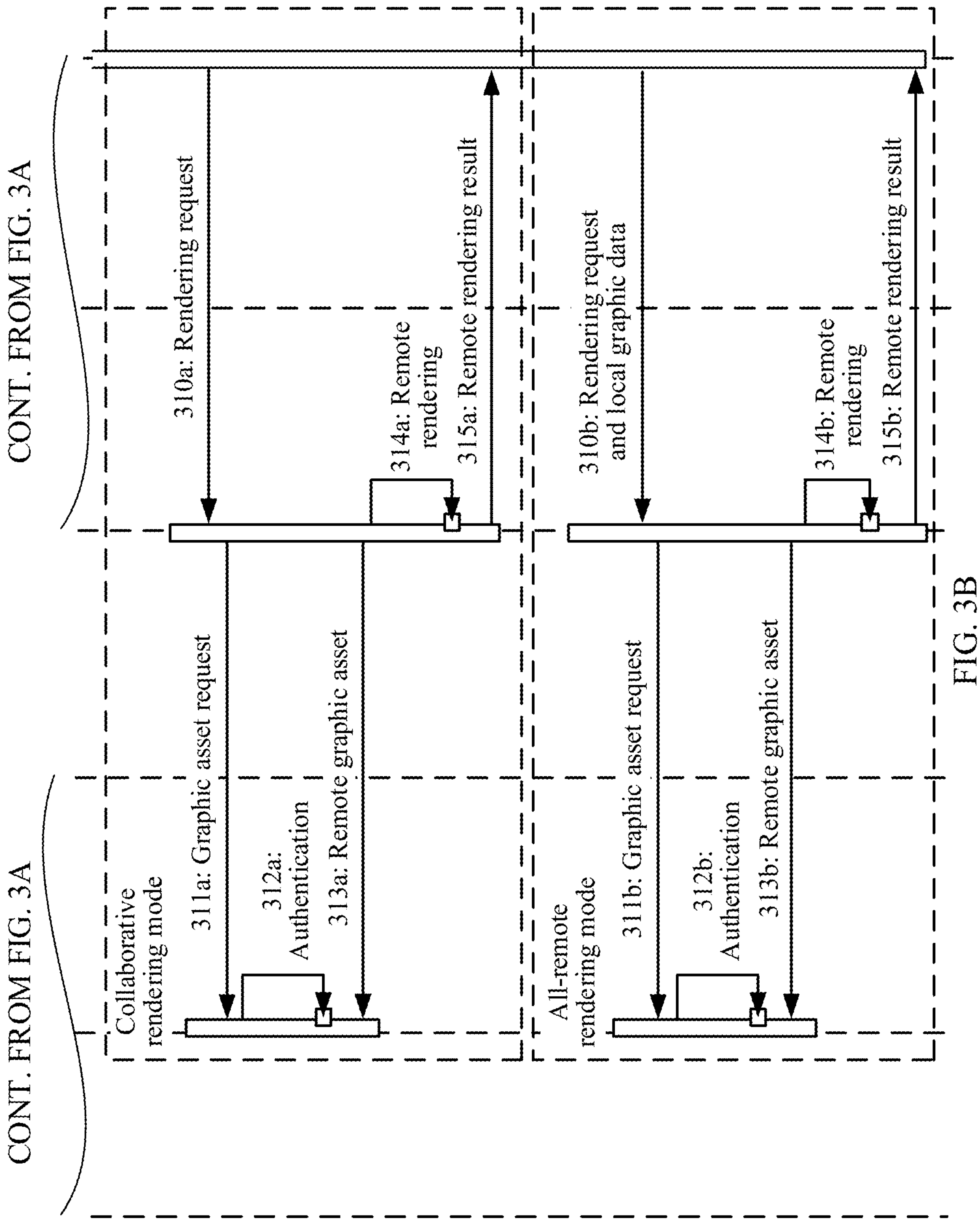

With reference to FIG. 3A and FIG. 3B, the following describes a procedure of the graphic rendering solution provided in embodiments of this application and functions of the foregoing functional units. The cloud management platform in the data center may provide a graphic asset upload and storage service, a graphic asset transaction service, and the like for a user. The graphic asset upload and storage service may be provided by the asset management unit in the cloud management platform. The graphic asset transaction service may be provided by the transaction unit in the cloud management platform. The rendering unit in the data center may provide a cloud rendering service for the user. The following focuses on the functions of these functional units with reference to the implementation procedure of the graphic rendering solution.

FIG. 3A and FIG. 3B show the implementation procedure of the graphic rendering solution according to an embodiment of this application.

As shown in FIG. 3A and FIG. 3B, in step 301, an asset provider may upload a graphic asset to the asset management unit in the cloud management platform. In other words, in step 301, the asset management unit may receive the graphic asset uploaded by the asset provider. The asset provider may also be referred to as an asset supplier or a supplier. The asset provider is an owner of the graphic asset and can freely dispose of the graphic asset. The asset management unit may be configured to store and manage the graphic asset, and may further provide a login interface for the asset provider to log in to the asset management unit, so that the asset provider can upload the graphic asset to the asset management unit. It may be understood that a resource management unit may provide a login interface for a plurality of asset providers, and different asset providers of the plurality of asset providers may log in, through the login interface, to the asset management unit by using different accounts, to upload graphic assets to the asset management unit.

An off-cloud or local asset provider can remotely access the asset management unit and upload a graphic asset to the asset management unit, so that the asset management unit stores and manages the graphic asset. The asset management unit can store and manage a plurality of graphic assets at the same time. Different graphic assets of the plurality of graphic assets may be owned by a same user, or may be owned by different users. Each graphic asset stored in the asset management unit may have a preset asset identity (ID). The asset identity of the graphic asset may also be referred to as identification information of the graphic asset, and is for representing the graphic asset, to distinguish the graphic asset from another graphic asset. In an example, the asset identity of the graphic asset may be generated by setting based on a preset rule when the owner of the graphic asset uploads the graphic asset to the asset management unit. In an example, the asset identity of the graphic asset may be automatically generated by the asset management unit when the graphic asset is uploaded to the asset management unit. In an example, the asset identity of the graphic asset may be a specified number, and the number may include a numeral and/or a letter. In another example, the asset identity of the graphic asset may be a string of characters.

The asset management unit may receive and store graphic assets uploaded by different asset providers. For example, management personnel of the data center or the cloud management platform may also serve as an asset provider to upload a graphic asset.

The graphic asset may correspond to a preset resource quantity. The resource quantity corresponding to the graphic asset is a specific quantity of resources, and represents the value or preset value of the graphic asset. The resource herein may be a currency, a bonus point, a gold coin, or the like. The resource quantity corresponding to the graphic asset may be set by the owner of the graphic asset. The resource quantity of the graphic asset corresponds to preset use permission. After an asset user pays the corresponding resource quantity to an account corresponding to the owner of the graphic asset, the asset user may obtain the use permission, so that transaction of the graphic asset is completed. The asset user may also be referred to as a demander, and is a user who uses the graphic asset to render a three-dimensional model or a three-dimensional scenario.

After obtaining the use permission of the graphic asset, the asset user can use the graphic asset. Using the graphic asset does not mean obtaining the graphic asset, but the graphic asset may be used for rendering the three-dimensional model or scenario for the asset user. For example, the asset user may request the rendering unit to invoke the graphic asset to render the three-dimensional model or scenario. Because the asset user has the use permission of the graphic asset, the asset management unit may allow the rendering unit to invoke the graphic asset. During, before, and after the use of the graphic asset for rendering the three-dimensional model or the three-dimensional scenario for the asset user, the graphic asset cannot be obtained by the asset user, or in other words, the graphic asset or a copy of the graphic asset cannot be obtained by the asset user.

Graphic assets represented by the same asset identity can be classified into different versions. The graphic assets of different versions may be distinguished by using the asset identity and a version number. For example, information included in a graphic asset of a poor version of the graphic assets of different versions is simpler. For example, data for describing a model vertex and a texture is simpler. The poor version may also be referred to as a low-definition version. A visual effect of a model or scenario rendered by using the graphic asset of the poor version is poor. For example, a definition is low. Comparatively, a graphic asset of a good version includes more abundant information, and a visual effect of a model or scenario rendered by using the graphic asset of the good version is good. In some embodiments, when the asset user may need to preview a rendering result corresponding to the graphic asset, or after the asset user obtains the use permission of the graphic asset represented by the asset identity, a good version of the graphic asset cannot be obtained by the asset user, but a poor version can be obtained by the asset user, so that the asset user performs scenario editing locally.

Still refer to FIG. 3A and FIG. 3B. In step 302, the asset provider sets, in the transaction unit in the cloud management platform, the graphic asset to be tradable, and configures a price for the graphic asset. Configuring the price may specifically include setting the resource quantity corresponding to the graphic asset, a use permission validity period, and the like. Specifically, the asset provider may set, in the transaction unit, the resource quantity corresponding to the graphic asset and the use permission validity period. For example, a plurality of resource quantities and corresponding use permission validity periods may be set for a same graphic asset. For example, a resource quantity A1, a use permission validity period A11 corresponding to the resource quantity A1, a resource quantity A2, and a use permission validity period A21 corresponding to the resource quantity A2 may be set. The resource quantity A1 is different from the resource quantity A2, and the use permission validity period A11 is different from the use permission validity period A21. After the asset user pays the resource quantity A1 to the asset provider, the asset user has the use permission of the graphic asset within the use permission validity period A11. Similarly, after the asset user pays the resource quantity A2 to the asset provider, the asset user has the use permission of the graphic asset within the use permission validity period A21. In an example, the resource quantity A1 may be set to a currency of a specific amount, and the use permission validity period A11 is one month.

After the price is configured for the graphic asset, the asset provider may publish introduction information and the price of the graphic asset on the internet by using the asset management unit. In other words, the asset management unit may publicly display the introduction information and the price of the graphic asset on the internet. For example, the introduction information of the graphic asset may be information that can be used by the user to learn a model or scenario to which the graphic asset is for rendering. For example, the introduction information may include a name, a type, and the like of the graphic asset.

In some embodiments, when the management personnel of the data center or the cloud management platform are the asset provider, the management personnel of the data center may configure a price for a graphic asset uploaded by the management personnel of the data center, or may set a graphic asset uploaded by the management personnel of the data center as a free graphic asset, so that the asset user can use the graphic asset free of charge.

The local apparatus is an apparatus for the asset user to use the graphic asset. Specifically, the asset user may query, purchase, and request to render the graphic asset by using the local apparatus, and receive a rendering result of the graphic asset. In this embodiment of this application, the local apparatus may also be understood as the asset user.

In some embodiments, as shown in FIG. 3A and FIG. 3B, the transaction client in the local apparatus may receive a query operation instruction of an off-cloud or local asset user, and perform step 303 based on the query operation instruction, to send query information to the transaction unit. The transaction unit can provide a graphic asset query function for the asset user. The transaction unit may receive the query information sent by the asset user by using the transaction client, determine, based on the query information, the graphic asset to be queried by the asset user, and provide the introduction information of the graphic asset to the asset user. Specifically, the transaction unit may perform step 304 to send the introduction information of the graphic asset to the transaction client, to provide the introduction information of the graphic asset to the asset user.

In some embodiments, the query information may include description information of the three-dimensional model or scenario. For example, the description information may be "car", indicating that the description information is for querying a graphic asset that can be used for rendering a three-dimensional car model. The transaction unit may determine, based on the description information of the three-dimensional model or scenario, the graphic asset to be queried by the asset user.

In some embodiments, the transaction unit may provide a graphic asset introduction page, and the transaction client may display the graphic asset introduction page. The graphic asset introduction page may include brief introduction information of one or more graphic assets, for example, a rough outline or a type of the three-dimensional model or scenario corresponding to the graphic asset. The asset user may select, from the brief introduction information of the one or more graphic assets, a graphic asset that may be needed by the asset user, and feed back, to the transaction unit, the graphic asset selected by the asset user. The feedback may also be understood as query information, and is for requesting the transaction unit to provide more detailed introduction information.

In some embodiments, the introduction information of the graphic asset may include the resource quantity corresponding to the graphic asset. In some embodiments, the introduction information may further include description information of the graphic asset, and the description information may describe a model or scenario corresponding to the graphic asset. The description information of the graphic asset may be preset and stored in the transaction unit or stored in the asset management unit together with the graphic asset.

In some embodiments, the introduction information of the graphic asset may include the rendering result of the graphic asset, to be specific, an image of the three-dimensional model or scenario corresponding to the graphic asset. Specifically, after determining the graphic asset, the transaction unit may request the rendering unit to render the graphic asset, to obtain the rendering result of the graphic asset, so that the asset user can visually and intuitively view the three-dimensional model or the three-dimensional scenario after the graphic asset is rendered.

In some embodiments, as described above, the graphic asset has a low-definition version. The asset user may send a preview request for the graphic asset to the transaction unit. In response to the preview request, the transaction unit may obtain the low-definition version of the graphic asset from the asset management unit, and send the low-definition version to the asset user, so that the asset user can locally render the low-definition version, to preview the rendering result of the graphic asset.

In some embodiments, the introduction information of the graphic asset may further include the asset identity of the graphic asset, so that the asset user can perform graphic asset transaction by using the asset identity in a subsequent step, and request, by using the asset identity, the rendering unit to render the three-dimensional model or scenario.

Still refer to FIG. 3A and FIG. 3B. In some embodiments, when the asset user logs in to the transaction unit, the transaction client and the transaction unit may perform graphic asset transaction in step 305. The transaction unit may provide a login interface for a plurality of asset users. Different asset users of the plurality of asset users may log in, through the login interface, to the transaction unit by using different accounts, so as to query and purchase a graphic asset by using the transaction unit, to implement the transaction of the graphic asset. In a transaction process of the graphic asset, the transaction unit may further provide a payment entrance for the transaction client, so that the asset user may pay, by using the payment entrance, a corresponding resource quantity to the asset provider or an asset account of the corresponding asset provider, to purchase the graphic asset.

In some embodiments, the asset account of the asset provider may be an account of a payment platform. The payment platform may be a third-party payment platform, or may be a payment platform specially disposed in the data center, or a payment platform specially disposed in a graphic rendering system. After the asset account of the asset provider receives the resource quantity that is of the corresponding graphic asset and that is paid by the asset user, the payment platform may send payment success information for the graphic asset to the transaction unit in the cloud management platform, where the payment success message may include the identification information or the asset identity of the graphic asset, so that the transaction unit may learn that the asset user has successfully purchased the graphic asset. The payment platform may also send the payment success information to the transaction client in the local apparatus, so that the local apparatus may obtain the identification information or the asset identity of the graphic asset purchased by the asset user. In some embodiments, the asset user and the asset provider may also perform offline transaction. After the asset user and the asset provider agree on the transaction for the graphic asset, the asset user may input the payment success information for the graphic asset in the transaction unit, where the payment success message may include the identification information or the asset identity of the graphic asset, so that the transaction unit may learn that the asset user has successfully purchased the graphic asset. The transaction unit may send the payment success information to the transaction client in the local apparatus, so that the local apparatus may obtain the identification information or the asset identity of the graphic asset purchased by the asset user.

After learning that the asset user has successfully purchased the graphic asset, the transaction unit may record that the asset user has the permission to use the graphic asset.

As described above, the asset user may perform information interaction by using the transaction client and the transaction unit in the local apparatus, to complete operations such as the graphic asset query and the graphic asset transaction. In some embodiments, the transaction client may be implemented as a browser. The transaction client may perform information interaction with the transaction unit by using an internet page (for example, a Web page). In some embodiments, the transaction client may be implemented as an application (APP). The transaction client may perform information interaction with the transaction unit by using the application. The transaction client and an information interaction manner between the transaction client and the transaction unit are not limited in this embodiment of this application.

When the transaction unit records that the asset user has use permission of a graphic asset, the transaction unit may perform step 306 to send authorization information to the asset management unit. The authorization information notifies the asset management unit that the asset user obtains use permission of which graphic assets. An example in which the asset user obtains a graphic asset B is used. The authorization information may include a binding relationship between a user identity of the asset user and an asset identity of the graphic asset B. The asset management unit may store the binding relationship, and determine, in a subsequent step by using the binding relationship, that the asset user has use permission of the graphic asset B. In addition, when the use permission obtained by the asset user has a validity period, the authorization information may further include a validity period of the binding relationship. While storing the binding relationship, the asset management unit may further record the validity period. When the validity period ends, the asset management unit may delete the binding relationship.

Still refer to FIG. 3A and FIG. 3B. In some embodiments, as described above, the graphic assets represented by the same asset identity may have different versions, and the visual effect of the model or scenario rendered by using the graphic asset of the poor version or the low-definition version is poor. The graphic asset B may be set to have different versions. To facilitate the asset user to perform scenario editing locally, the asset management unit may provide the asset user with the graphic asset B of a poor version or a low-definition version. Specifically, the asset management unit may perform step 307 to send the graphic asset B of the poor version or the low-definition version to the rendering client in the local apparatus. For example, after the transaction client completes a transaction of the graphic asset B with the transaction unit, the transaction client may send the asset identity of the graphic asset B to the rendering client. The rendering client may send, to the cloud management platform, request information for requesting the graphic asset B of the poor version or the low-definition version, where the request information includes the asset identity of the graphic asset B. The asset management unit may send, in response to the request information, the graphic asset B of the poor version or the low-definition version to the rendering client.

The rendering client is crucial to the graphic rendering solution provided in this embodiment of this application. In addition to the foregoing functions of sending the request information of the graphic asset of the poor version to the cloud data center and receiving an image asset of the poor version, the rendering client may further invoke a rendering capability of the cloud data center to perform model or scenario rendering. In summary, the rendering client may identify a graphic asset stored in the cloud data center, further request the cloud data center to use the graphic asset for rendering, and send a rendering result to the rendering client. The rendering client may display the received rendering result, or fuse the received rendering result and a local rendering result, and display a fused result. Functions of the rendering client are described in more detail below.

In some embodiments, the rendering client may be a graphic editing application, for example, 3dsMax® or MayaR®. To enable the graphic editing application to invoke the rendering capability of the cloud data center, a plug-in may be specially set. The graphic editing application can invoke the rendering capability of the cloud data center by using the plug-in. In some embodiments, the rendering client may be an application that is specially disposed and that has the function described in this embodiment of this application and the like. An implementation form of the rendering client is not specifically limited in this embodiment of this application.

In addition, in the following descriptions, for ease of description, the graphic asset (for example, graphic data in the asset management unit) stored in the cloud data center may be referred to as a remote graphic asset. If the remote graphic asset is graphic data, a three-dimensional model corresponding to the graphic data may be referred to as a remote three-dimensional model. If the remote graphic asset is scenario data, a three-dimensional scenario corresponding to the scenario data may be referred to as a remote three-dimensional scenario. Graphic data stored in the local apparatus may be referred to as local graphic data, and a three-dimensional model corresponding to the local graphic data may be referred to as a local three-dimensional model.

Still refer to FIG. 3A and FIG. 3B. The rendering client may perform step 308 based on an operation instruction of the asset user, to edit a three-dimensional scenario C. In some embodiments, editing the scenario may include setting a three-dimensional model included in the three-dimensional scenario C, that is, placing which three-dimensional models in the scenario C. In a process of editing the three-dimensional scenario C, the rendering client may receive the operation instruction of the user, and add, to the three-dimensional scenario C based on the operation instruction, a three-dimensional model that the three-dimensional scenario C does not originally include, or delete an original three-dimensional model in the three-dimensional scenario C. The remote three-dimensional model may be added to the three-dimensional scenario C. If the rendering client has obtained a remote graphic asset of a poor version corresponding to the remote three-dimensional model, the rendering client may render the remote three-dimensional model by using the remote graphic asset of the poor version, to obtain a rendering result, and place the rendering result in the three-dimensional scenario C to view a visual effect. If the rendering client does not obtain the remote graphic asset of the poor version of the remote three-dimensional model, the rendering client may replace the three-dimensional model with a preset graphic mark, a text symbol, or the like.

In the process of editing the three-dimensional scenario C, after the three-dimensional model included in the three-dimensional scenario C is determined, the operation instruction for the user to set a rendering parameter may be further received, and a rendering parameter of the three-dimensional model in the three-dimensional scenario C is set. The rendering parameter may also be referred to as a setting parameter, and may be used for describing any one or more of a location and an orientation of a related model or scenario in world coordinates, a light source location, a location and an orientation of a camera, and the like. The rendering parameter of the three-dimensional model in the three-dimensional scenario C may be used for describing a state of the three-dimensional model in the three-dimensional scenario C. For example, the rendering parameter may include a location, and the location may be used for describing a location of the three-dimensional model in the three-dimensional scenario C. For another example, the rendering parameter may include a size, and the size may be used for describing a size of the three-dimensional model in the three-dimensional scenario. The rendering parameter may include a light source location, a camera location, and a camera direction, and the light source location, the camera location, and the camera direction may be used for describing a visual effect presented by the three-dimensional model in the light source location, the camera location, and the camera direction.

The foregoing describes only an example of the general process of editing the scenario. For a more detailed process of editing the scenario, refer to descriptions in the current technology. Details are not described herein again.

In addition, when the rendering parameter of the remote three-dimensional model is set, if the rendering client obtains the remote graphic asset of the poor version corresponding to the remote three-dimensional model, the rendering client may locally render, based on the rendering parameter, the remote three-dimensional model by using the remote graphic asset of the poor version, adjust the rendering parameter based on the rendering result, then render, based on a rendering parameter, the remote three-dimensional model again by using the remote graphic asset of the poor version, and adjust the rendering parameter based on a re-rendering result, . . . until the rendering parameter is adjusted to a rendering parameter that meets a requirement or roughly meets a requirement. In this way, it is convenient for the asset user to adjust the rendering parameter of the remote three-dimensional model.

In some embodiments, the three-dimensional scenario C may be the remote three-dimensional model. Editing the three-dimensional scenario C may be setting the rendering parameter of the three-dimensional model in the three-dimensional scenario C. For example, if the rendering client obtains a remote graphic asset of a poor version corresponding to the remote three-dimensional scenario, the rendering client may locally render the remote three-dimensional scenario by using the remote graphic asset of the poor version, adjust the rendering parameter of the three-dimensional model in the remote three-dimensional scenario based on a rendering result, then render, based on a rendering parameter, the remote three-dimensional scenario again by using the remote graphic asset of the poor version, and adjust the rendering parameter based on a re-rendering result, . . . until the rendering parameter is adjusted to a rendering parameter that meets a requirement or roughly meets a requirement. For example, if the rendering client does not obtain the remote graphic asset of the poor version corresponding to the remote three-dimensional scenario, the rendering parameter of the three-dimensional model in the remote three-dimensional scenario may be set based on experience.

Still refer to FIG. 3A and FIG. 3B. The rendering client may perform step 309 to start rendering the three-dimensional scenario C. The rendering client may receive an operation instruction that is sent by the asset user and that is for starting scenario rendering, and start rendering the three-dimensional scenario C in response to the operation instruction.

When the three-dimensional scenario C includes both the remote three-dimensional model and the local three-dimensional model, the rendering of the three-dimensional scenario C has two rendering modes. One mode is a remote and local collaborative rendering mode, and the other mode is an all-remote rendering mode.

The following first describes the remote and local collaborative rendering mode.

In some embodiments, the three-dimensional scenario C may include a remote three-dimensional model C1. After starting rendering the three-dimensional scenario C, the rendering client may perform step 310*a* to send a rendering request to the cloud data center. The rendering request may include the user identity of the asset user and an asset identity corresponding to the remote three-dimensional model C1. The asset identity represents a remote graphic asset (specifically graphic data) for rendering the three-dimensional model C1. For example, the rendering client may obtain the asset identity and the user identity of the asset user from the transaction client, and add the asset identity and the user identity of the asset user to the rendering request.

The rendering unit in the cloud data center may render the three-dimensional model C1 in response to the rendering request. The rendering unit is configured to render a corresponding three-dimensional model or three-dimensional scenario for the asset user by using the graphic asset without sending the graphic asset or a copy of the graphic asset to the asset user. In other words, by the rendering unit, the graphic asset may be remotely used for rendering the three-dimensional model or the three-dimensional scenario for the asset user, so that a requirement of the asset user for using the graphic asset is met without sending the graphic asset or the copy of the graphic asset to the asset user, and the graphic asset is well protected.

The following describes functions of the rendering unit in detail.

In summary, the rendering unit may receive the rendering request sent by the rendering client, respond to the rendering request, when determining that the asset user has use permission of the corresponding graphic asset, if the asset user has the use permission, perform a rendering operation by using the graphic asset to obtain a rendering result, and then send the rendering result to the rendering client.

Specifically, after receiving the rendering request sent by the rendering client, the rendering unit may obtain the user identity and the asset identity in the rendering request, and add the user identity and the asset identity to the graphic asset request. Then, in step 311*a*, the graphic asset request is sent to the asset management unit, to request the remote graphic asset represented by the asset identity. After receiving the rendering request, the asset management unit may perform step 312*a* to perform authentication. Specifically, the asset management unit determines whether a binding relationship between the user identity and the asset identity is already stored in the asset management unit.

If the binding relationship between the user identity and the asset identity is not stored in the asset management unit, it indicates that the user represented by the user identity or the asset user does not have the use permission of the remote graphic asset represented by the asset identity. In this case, the asset management unit does not send the remote graphic asset represented by the asset identity to the rendering unit, and the rendering unit cannot use the remote graphic asset to perform rendering, so that an objective of protecting the remote graphic asset is achieved.

If the binding relationship between the user identity and the asset identity is already stored in the asset management unit, it indicates that the user represented by the user identity or the asset user has the use permission of the remote graphic asset represented by the asset identity, so that the asset management unit may perform step 312*a* to send the remote graphic asset represented by the asset identity to the rendering unit.

When the rendering unit receives the remote graphic asset or the remote graphic data of the three-dimensional model C1, step 314*a* may be performed to render the three-dimensional model C1 by using the remote graphic asset, to obtain a remote rendering result, where the remote rendering result is an image of the three-dimensional model C1 that is displayed or presented, and the remote rendering result may also be referred to as a remote rendering image. Specifically, the rendering unit may invoke a rendering engine program, and use the remote graphic asset to perform programmatic rendering. For a specific rendering process, refer to descriptions in the current technology. Details are not described herein again.

In some embodiments, the rendering request may further include a rendering parameter of the three-dimensional model C1 in the three-dimensional scenario C. In step 314*a*, the rendering unit may render, based on the rendering parameter, the three-dimensional model C1 by using the remote graphic asset, to obtain the remote rendering result.

Still refer to FIG. 3A and FIG. 3B. In step 315*a*, the rendering unit may send the remote rendering result obtained in step 314*a* to the rendering client, so that the asset user obtains the remote rendering result.

In some embodiments, step 314*a* and step 315*a* may be performed for a plurality of times. Specifically, when the rendering client receives the remote rendering result of the three-dimensional model C1, the rendering client may display the remote rendering result. After viewing the remote rendering result, if the asset user is not satisfied with a state of the three-dimensional model C1 in the three-dimensional scenario C, the asset user may set or adjust the rendering parameter of the three-dimensional model C1 in the three-dimensional scenario C again. The rendering client may send a new rendering parameter to the rendering unit. The rendering unit may perform step 314*a* again, and render, based on the new rendering parameter, the three-dimensional model C1 again by using the remote graphic asset, to obtain a new remote rendering result. The rendering unit may perform step 315*a* again to send the new remote rendering result to the rendering client. The rendering client may display the new remote rendering result. After viewing the new remote rendering result, if the asset user is still not satisfied with a state of the three-dimensional model C1 in the three-dimensional scenario C, the asset user may set or adjust the rendering parameter of the three-dimensional model C1 in the three-dimensional scenario C again. The rendering client may send a latest set rendering parameter to the rendering unit, so that the rendering unit performs steps 314*a* and 315*a* again. This process repeats until the asset user no longer sets or adjusts the rendering parameter of the three-dimensional model C1 in the three-dimensional scenario C.

In some embodiments, in step 314*a*, the rendering unit may further determine image depth information of the remote rendering result. In an example, depth information of each pixel in the remote rendering image may be determined, and the depth information is associated with a corresponding pixel, to obtain the image depth information of the remote rendering result. In step 315*a*, the image depth information and the remote rendering result are sent to the rendering client together.

The foregoing describes remote rendering in the remote and local collaborative rendering mode. The following describes local rendering by using an example.

In some embodiments, the three-dimensional scenario C may include a local three-dimensional model C2. To be specific, graphic data for rendering the local three-dimensional model C2 is local graphic data. The local graphic data may be obtained by the local apparatus, and may be stored in the local apparatus. The rendering client may render the local three-dimensional model C2 by using the local graphic data, to obtain a local rendering result. For example, the rendering client may determine image depth information of the local rendering result. The local rendering result is an image for displaying the local three-dimensional model C2, or the local rendering result may be referred to as a local rendering image.

After obtaining the remote rendering result (or the remote rendering image) and the local rendering result (or the local rendering image), the rendering client may fuse the remote rendering result and the local rendering result to obtain a rendering result of the three-dimensional scenario C, in other words, a rendered image for displaying the three-dimensional scenario C.

In some embodiments, the remote rendering result has the image depth information, and the local rendering result also has the image depth information. When the remote rendering result and the local rendering result are fused, the remote rendering result and the local rendering result may be fused based on the image depth information of the remote rendering result and the image depth information of the local rendering result, to obtain the rendering result of the three-dimensional scenario C. More specifically, the image depth information of the remote rendering result describes a depth of each pixel in the remote rendering result, and the image depth information of the local rendering result describes a depth of each pixel in the local rendering result. When the remote rendering result and the local rendering result are fused, pixels in the remote rendering result and the local rendering result may be sorted in a depth direction, and then relative positions of the pixels in the rendered image of the three-dimensional scenario C are determined based on a sorting result, so that the remote rendering result and the local rendering result are fused based on the relative positions. In this way, a fusion effect can be improved.

The preceding example describes the remote and local collaborative rendering mode. The following describes the all-remote rendering mode.

It may be set that the three-dimensional scenario C includes a remote three-dimensional model C1 and a local three-dimensional model C2. A graphic asset for rendering the remote three-dimensional model C1 is a remote graphic asset (or remote graphic data). Graphic data for rendering the local three-dimensional model C2 is local storage data.

Still refer to FIG. 3A and FIG. 3B. The rendering client may perform step 310*b* to send a rendering request and local graphic data to the rendering unit. For details about the rendering unit and the rendering request, refer to the foregoing descriptions. Details are not described herein again.

The rendering unit may perform step 311*b* to request, from the asset management unit, the graphic asset corresponding to the remote three-dimensional model C1. For details, refer to the foregoing descriptions of step 311*a*. The asset management unit may perform step 312*b* to perform authentication, and perform step 313*b* to send the graphic asset corresponding to the remote three-dimensional model C1 to the rendering unit. For details, refer to the foregoing descriptions of step 312*a* and step 313*a*.

In step 314*b*, the rendering unit may render the remote three-dimensional model C1 based on the graphic asset corresponding to the remote three-dimensional model C1, and render the local three-dimensional model C2 based on the local graphic data.

Then, in step 315*b*, the rendering unit may obtain a remote rendering result of the three-dimensional scenario C based on a rendering result of the remote three-dimensional model C1 and a rendering result of the local three-dimensional model C2, and send the remote rendering result of the three-dimensional scenario C to the rendering client, so that the asset user obtains the remote rendering result.

In some embodiments, in the all-remote rendering mode, the rendering unit may also receive a rendering parameter sent by the rendering client, and in step 314, render the remote three-dimensional model C1 and/or the local three-dimensional model C2 based on the rendering parameter. In addition, step 314*b* and step 315*b* may be performed for a plurality of times, to allow the asset user to adjust or modify the rendering parameter based on the remote rendering result. For details, refer to the foregoing descriptions of step 314*b* and step 315*b*. Details are not described herein again.

The foregoing describes a solution of rendering the three-dimensional scenario C when the three-dimensional scenario C includes both the remote three-dimensional model and the local three-dimensional model.

The following describes a solution of rendering the three-dimensional scenario C when all three-dimensional models included in the three-dimensional scenario C are remote three-dimensional models, or the three-dimensional scenario C is a remote three-dimensional scenario.

In some embodiments, the three-dimensional scenario C includes a plurality of remote three-dimensional models, and the plurality of remote three-dimensional models respectively correspond to different remote graphic assets. A rendering request sent by the rendering client to the rendering unit may include asset identities corresponding to the plurality of remote three-dimensional models. The rendering unit may request corresponding graphic assets from the asset management unit based on the asset identities corresponding to the plurality of remote three-dimensional models. After completing authentication, the asset management unit may send the corresponding graphic assets to the rendering unit. The rendering unit may render the plurality of remote three-dimensional models by using the graphic assets, and fuse rendering results of the plurality of remote three-dimensional models to obtain a remote rendering result of the three-dimensional scenario C. Then, the rendering unit may send the remote rendering result of the three-dimensional scenario C to the rendering client, so that the asset user obtains the remote rendering result.

In some embodiments, the three-dimensional scenario C is the remote three-dimensional scenario. To be specific, scenario data of the three-dimensional scenario C is a graphic asset represented by an asset identity. A rendering request sent by the rendering client to the rendering unit includes the asset identity corresponding to the three-dimensional scenario C. The rendering unit may request, from the asset management unit based on the asset identity, the graphic asset (or the scenario data) corresponding to the three-dimensional scenario C. After completing authentication, the asset management unit may send the graphic asset corresponding to the three-dimensional scenario C to the rendering unit. The rendering unit may render the three-dimensional scenario C by using the graphic asset corresponding to the three-dimensional scenario C, to obtain a remote rendering result of the three-dimensional scenario C. Then, the rendering unit may send the remote rendering result of the three-dimensional scenario C to the rendering client, so that the asset user obtains the remote rendering result.

In some embodiments, as described above, the asset management unit may receive and store graphic assets uploaded by a plurality of asset providers. Management personnel of the data center or the cloud management platform may also serve as an asset provider to upload a graphic asset. For ease of description, a graphic asset uploaded by an asset provider of different asset providers may be referred to as a graphic asset D1, and a graphic asset uploaded by another asset provider may be referred to as a graphic asset D2. In comparison with the graphic asset D1, the graphic asset D2 may be referred to as a third-party graphic asset. Similarly, in comparison with the graphic asset D2, the graphic asset D1 may also be referred to as a third-party graphic asset.

In some cases, a three-dimensional scenario that the asset user renders may include three-dimensional models corresponding to graphic assets provided by different asset providers at the same time. In this case, the rendering request sent by the asset user in step 310*a* may be used for requesting the cloud data center to render the three-dimensional models corresponding to the graphic assets provided by different asset providers at the same time.

An example in which the three-dimensional scenario that the asset user renders includes both a three-dimensional model corresponding to the graphic asset D1 and a three-dimensional model corresponding to the graphic asset D2 is used. The rendering request may include the user identity of the asset user, an asset identity of the graphic asset D1, and an asset identity of the graphic asset D2. The rendering unit may receive the rendering request, and then may request the graphic asset D1 and the graphic asset D2 from the asset management unit based on the user identity of the asset user, the asset identity of the graphic asset D1, and the asset identity of the graphic asset D2.

After completing authentication on the graphic asset D1 and the graphic asset D2, the asset management unit may send the graphic asset D1 and the graphic asset D2 to the rendering unit. In an example, the graphic asset D1 may be set as a free graphic asset (where for example, the graphic asset D1 is a graphic asset uploaded by the management personnel of the data center and set as a free-of-charge graphic asset). In this case, the asset management unit may directly send the graphic asset D1 to the rendering unit without performing authentication on the graphic asset D1.

The rendering unit may render the graphic asset D1 and the graphic asset D2, to obtain remote rendering results. For example, the rendering unit may render the graphic asset D1 and the graphic asset D2 as a whole, and then obtain an overall rendering result. Then, the rendering unit may send the remote rendering results to the rendering client, so that the asset user obtains the remote rendering results.

According to the graphic rendering solution provided in this embodiment of this application, the three-dimensional model or the three-dimensional scenario can be rendered without sending the graphic asset or the copy of the graphic asset to the asset user, so that the graphic asset is protected while the rendering requirement of the asset user for the three-dimensional model or the three-dimensional scenario is met. This avoids illegal distribution of the graphic asset and further avoids damage to the asset of the graphic asset owner.

Figure 4:
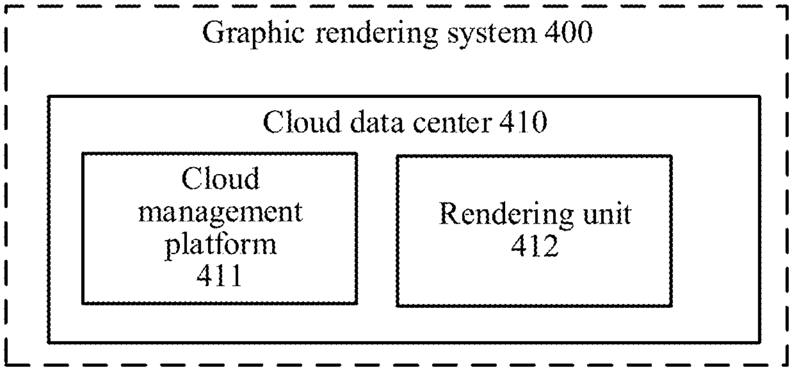
FIG. 4 is a diagram of a structure of a cloud technology-based graphic rendering system according to an embodiment of this application.

With reference to FIG. 4, the following describes a cloud technology-based graphic rendering system 400 according to an embodiment of this application. It may be understood that, the graphic rendering system 400 is proposed based on the foregoing solution, is another expression manner of the foregoing solution, and the two are combined.

As shown in FIG. 4, the graphic rendering system 400 includes a cloud management platform 411 and a rendering unit 412 that are disposed in a cloud data center 410. The cloud management platform 411 is configured to provide a login interface for a plurality of off-cloud asset providers and a plurality of off-cloud asset users to remotely log in to the cloud management platform 411 by using different accounts. The cloud management platform 411 is configured to: receive a first graphic asset uploaded by at least one of the plurality of asset providers, set the first graphic asset to be tradable, configure a price for the first graphic asset, and publicly display introduction information and the price of the first graphic asset on the internet; the cloud management platform 411 is configured to: receive payment success information of at least one of the plurality of asset users for the first graphic asset, and record, based on the payment success information, that the at least one asset user has permission to use the first graphic asset; the rendering unit 412 is configured to: receive a rendering request that is for the first graphic asset and that is sent by the at least one asset user, and request the first graphic asset from the cloud management platform 411 in response to the rendering request; the cloud management platform 411 is configured to: when determining that the at least one asset user has the permission to use the first graphic asset, send the first graphic asset to the rendering unit 412; and the rendering unit 412 is configured to: render the first graphic asset to generate a first rendering result, and send the first rendering result to the at least one asset user. For implementation of functions of the cloud management platform 411, refer to the foregoing descriptions of the operations performed by the asset management unit and the transaction unit in FIG. 3A and FIG. 3B. The rendering unit 412 may be implemented with reference to the foregoing descriptions of the operations performed by the rendering unit in FIG. 3A and FIG. 3B.

In some embodiments, the rendering unit 412 is configured to: obtain, from the at least one asset user, a setting parameter of a model or scenario related to the first graphic asset, generate depth information of the first rendering result based on the setting parameter, and send the depth information to the at least one asset user, where the at least one asset user fuses the first rendering result into a local model or scenario based on the depth information.

In an example of these embodiments, the setting parameter includes one or any combination of a location and an orientation of the model or scenario related to the first graphic asset in world coordinates, a light source location, and a location and an orientation of a camera.

In some embodiments, the rendering unit 412 is configured to: obtain a local graphic asset from the at least one asset user, and render the local graphic asset while rendering the first graphic asset to generate the first rendering result, to generate a second rendering result; and the rendering unit 412 is configured to: fuse the second rendering result and the first rendering result, and send a fused rendering result to the at least one asset user.

In some embodiments, the cloud management platform 411 stores a preset third-party graphic asset, and the rendering request is further for requesting to render the third-party graphic asset, so that the rendering unit 412 further requests the third-party graphic asset from the cloud management platform 411 while requesting the first graphic asset from the cloud management platform 411; the cloud management platform 411 is configured to send the third-party graphic asset to the rendering unit 412 while sending the first graphic asset to the rendering unit 412; the rendering unit 412 is configured to render the first graphic asset and the third-party graphic asset to generate a third rendering result; and the rendering unit 412 is configured to send the third rendering result to the at least one asset user.

In some embodiments, the payment success information records identification information of the first graphic asset, and the rendering request carries the identification information of the first graphic asset; and the rendering unit 412 is configured to request, from the cloud management platform 411, a graphic asset corresponding to the identification information carried in the rendering request.

In some embodiments, the cloud management platform 411 is configured to receive the first graphic asset and a low-definition version of the first graphic asset that are uploaded by the at least one of the plurality of asset providers; the cloud management platform 411 is configured to receive a preview request that is for the first graphic asset and that is sent by the at least one asset user; and the cloud management platform 411 is configured to send the low-definition version of the first graphic asset to the at least one asset user.

In some embodiments, the first graphic asset is a graphic model, and the first graphic model includes geometry information, material information, and texture information.

In some embodiments, the first graphic asset is a graphic scenario, and the graphic scenario includes at least one graphic model and light source information and/or camera information.

According to the graphic rendering system provided in this embodiment of this application, a three-dimensional model or a three-dimensional scenario can be rendered without sending the graphic asset or a copy of the graphic asset to the asset user, so that the graphic asset is protected while a rendering requirement of the asset user for the three-dimensional model or the three-dimensional scenario is met. This avoids illegal distribution of the graphic asset and further avoids damage to an asset of a graphic asset owner.

Figure 5:
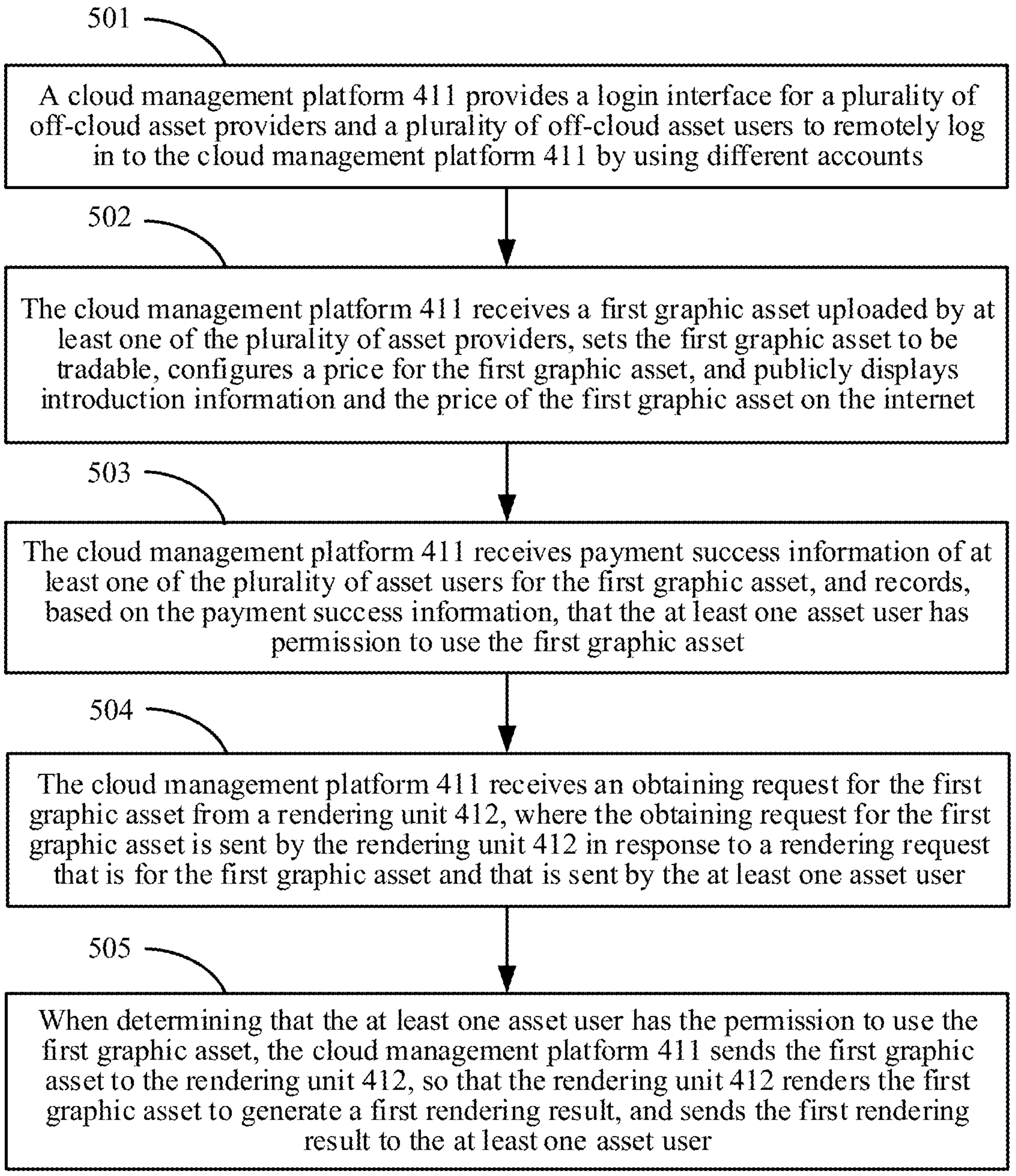
FIG. 5 is a flowchart of a cloud technology-based graphic rendering method according to an embodiment of this application.

With reference to FIG. 5, the following describes a cloud technology-based graphic rendering method according to an embodiment of this application. It may be understood that the method is proposed based on the foregoing solution. The method is another expression manner of the foregoing solution, and the two are combined.

The method may be applied to a cloud management platform 411 in a graphic rendering system 400. The graphic rendering system 400 further includes a rendering unit 412. The cloud management platform 411 and the rendering unit 412 are disposed in a cloud data center. As shown in FIG. 5, the method includes the following steps.

Step 501: The cloud management platform 411 provides a login interface for a plurality of off-cloud asset providers and a plurality of off-cloud asset users to remotely log in to the cloud management platform 411 by using different accounts.

Step 502: The cloud management platform 411 receives a first graphic asset uploaded by at least one of the plurality of asset providers, sets the first graphic asset to be tradable, configures a price for the first graphic asset, and publicly displays introduction information and the price of the first graphic asset on the internet.

Step 503: The cloud management platform 411 receives payment success information of at least one of the plurality of asset users for the first graphic asset, and records, based on the payment success information, that the at least one asset user has permission to use the first graphic asset.

Step 504: The cloud management platform 411 receives an obtaining request for the first graphic asset from the rendering unit 412, where the obtaining request for the first graphic asset is sent by the rendering unit 412 in response to a rendering request that is for the first graphic asset and that is sent by the at least one asset user.

Step 505: When determining that the at least one asset user has the permission to use the first graphic asset, the cloud management platform 411 sends the first graphic asset to the rendering unit 412, so that the rendering unit 412 renders the first graphic asset to generate a first rendering result, and sends the first rendering result to the at least one asset user.

In some embodiments, the cloud management platform 411 stores a preset third-party graphic asset, the rendering request is further for requesting to render the third-party graphic asset, and the obtaining request for the first graphic asset is further for requesting the third-party graphic asset; and sending the first graphic asset to the rendering unit 412 includes: The cloud management platform 411 sends the first graphic asset and the third-party graphic asset to the rendering unit 412, so that the first graphic asset and the third-party graphic asset are rendered to generate a third rendering result, and the third rendering result is sent to the at least one asset user.

In some embodiments, the payment success information records identification information of the first graphic asset, and the obtaining request for the first graphic asset carries the identification information; and sending the first graphic asset to the rendering unit 412 includes: The cloud management platform 411 sends a graphic asset corresponding to the identification information to the rendering unit 412.

In some embodiments, the method further includes: The cloud management platform 411 receives the first graphic asset and a low-definition version of the first graphic asset that are uploaded by the at least one of the plurality of asset providers; the cloud management platform 411 receives a preview request that is for the first graphic asset and that is sent by the at least one asset user; and the cloud management platform 411 sends the low-definition version of the first graphic asset to the at least one asset user.

In some embodiments, the first graphic asset is a graphic model, and the first graphic model includes geometry information, material information, and texture information.

In some embodiments, the first graphic asset is a graphic scenario, and the graphic scenario includes at least one graphic model and light source information and/or camera information.

According to the graphic rendering method provided in this embodiment of this application, a three-dimensional model or a three-dimensional scenario can be rendered without sending the graphic asset or a copy of the graphic asset to the asset user, so that the graphic asset is protected while a rendering requirement of the asset user for the three-dimensional model or the three-dimensional scenario is met. This avoids illegal distribution of the graphic asset and further avoids damage to an asset of a graphic asset owner.

According to the cloud management platform provided in this embodiment of this application, a three-dimensional model or a three-dimensional scenario can be rendered without sending the graphic asset or a copy of the graphic asset to the asset user, so that the graphic asset is protected while a rendering requirement of the asset user for the three-dimensional model or the three-dimensional scenario is met. This avoids illegal distribution of the graphic asset and further avoids damage to an asset of a graphic asset owner.

Figure 6:
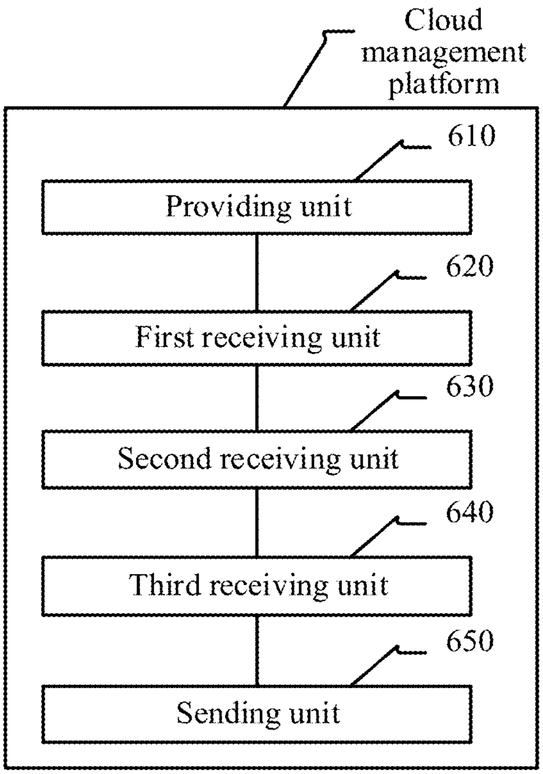
FIG. 6 is a diagram of a structure of a cloud management platform according to an embodiment of this application.

Refer to FIG. 6. An embodiment of this application provides a cloud management platform. The cloud management platform belongs to a graphic rendering system, the graphic rendering system further includes a rendering unit, and the cloud management platform and the rendering unit are disposed in a cloud data center. As shown in FIG. 6, the cloud management platform includes: a providing unit 610, configured to provide a login interface for a plurality of off-cloud asset providers and a plurality of off-cloud asset users to remotely log in to the cloud management platform by using different accounts; a first receiving unit 620, configured to: receive a first graphic asset uploaded by at least one of the plurality of asset providers, set the first graphic asset to be tradable, configure a price for the first graphic asset, and publicly display introduction information and the price of the first graphic asset on the internet; a second receiving unit 630, configured to: receive payment success information of at least one of the plurality of asset users for the first graphic asset, and record, based on the payment success information, that the at least one asset user has permission to use the first graphic asset; a third receiving unit 640, configured to receive an obtaining request for the first graphic asset from the rendering unit, where the obtaining request for the first graphic asset is sent by the rendering unit in response to a rendering request that is for the first graphic asset and that is sent by the at least one asset user; and a sending unit 650, configured to: when determining that the at least one asset user has the permission to use the first graphic asset, send the first graphic asset to the rendering unit, so that the rendering unit renders the first graphic asset to generate a first rendering result, and sends the first rendering result to the at least one asset user.

For functions of functional modules of the cloud management platform, reference may be further made to the foregoing descriptions of the operations performed by the asset management unit and the transaction unit in FIG. 3A and FIG. 3B and the operations performed by the cloud management platform in FIG. 4. Details are not described herein again.

Figure 7:
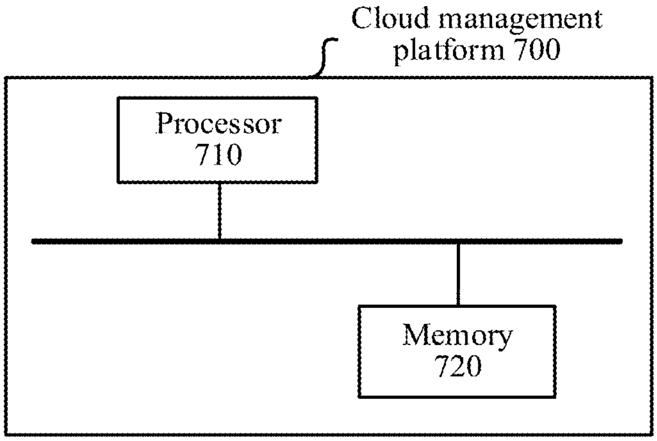
FIG. 7 is a diagram of a structure of a cloud management platform according to an embodiment of this application.

Refer to FIG. 7. An embodiment of this application provides a cloud management platform 700, including a processor 710 and a memory 720. The memory 720 is configured to store computer instructions. The processor 710 is configured to execute the computer instructions stored in the memory 720, so that the cloud management platform 700 can perform operations of the asset management unit and the transaction unit in the embodiments shown in FIG. 3A and FIG. 3B, or perform operations of the cloud management platform shown in FIG. 4. For example, the cloud management platform 700 may provide a login interface for a plurality of off-cloud asset providers and a plurality of off-cloud asset users to remotely log in to the cloud management platform by using different accounts; the cloud management platform 700 may receive a first graphic asset uploaded by at least one of the plurality of asset providers, set the first graphic asset to be tradable, configure a price for the first graphic asset, and publicly display introduction information and the price of the first graphic asset on the internet; the cloud management platform 700 may receive payment success information of at least one of the plurality of asset users for the first graphic asset, and record, based on the payment success information, that the at least one asset user has permission to use the first graphic asset; the cloud management platform 700 may receive an obtaining request for the first graphic asset from a rendering unit, where the obtaining request for the first graphic asset is sent by the rendering unit in response to a rendering request that is for the first graphic asset and that is sent by the at least one asset user; and when determining that the at least one asset user has the permission to use the first graphic asset, the cloud management platform 700 may send the first graphic asset to the rendering unit, so that the rendering unit renders the first graphic asset to generate a first rendering result, and sends the first rendering result to the at least one asset user.

It can be understood that the processor in embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include corresponding software modules. The software modules may be stored in a random-access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. It is clear that the storage medium may be a component of the processor. The processor and the storage medium may be disposed in an ASIC.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It may be understood that various numbers in embodiments of this application are merely used for differentiation for ease of description, and are not used to limit the scope of embodiments of this application.

The invention claimed is:

1. A cloud data center comprising:
- a cloud management platform configured to:
  - provide a login interface for a plurality of off-cloud asset providers and a plurality of off-cloud asset users to remotely log in to the cloud management platform using different accounts;
  - store a preset third-party graphic asset;
  - receive a first graphic asset from at least one of the plurality of off-cloud asset providers;
  - set the first graphic asset to be tradable;
  - obtain introduction information of the first graphic asset;
  - set a price for the first graphic asset;
  - publicly display the introduction information and the price on at least one publicly accessible webpage;
  - receive payment success information of at least one asset user of the plurality of off-cloud asset users for the first graphic asset; and
  - record, based on the payment success information, that the at least one asset user has permission to use the first graphic asset; and
- a rendering device comprising one or more processors and configured to:
  - receive, from the at least one asset user, a rendering request that is for the first graphic asset and the preset third-party graphic asset;
  - request the first graphic asset and the preset third-party graphic asset from the cloud management platform in response to the rendering request;
  - receive, from the cloud management platform when the at least one asset user has permission to use the first graphic asset, the first graphic asset and the preset third-party graphic asset;
  - render the first graphic asset and the preset third-party graphic asset to generate a first rendering result; and
  - send the first rendering result to the at least one asset user, wherein the first graphic asset and the preset third-party graphic asset are not transmitted to the at least one asset user during or after the rendering of the first graphic asset and the preset third-party graphic asset.

2. The cloud data center according to claim 1, wherein the rendering device is further configured to:
- obtain, from the at least one asset user, a setting parameter of a model or a scenario related to the first graphic asset;
- generate depth information of the first rendering result based on the setting parameter; and
- send the depth information to the at least one asset user for fusing the first rendering result into a local model or a local scenario based on the depth information.

3. The cloud data center according to claim 2, wherein the setting parameter comprises a location and an orientation in world coordinates, a light source location, or a location and an orientation of a camera.

4. The cloud data center according to claim 1, wherein the rendering device is further configured to:
- obtain a local graphic asset from the at least one asset user;
- render the local graphic asset while rendering the first rendering result in order to generate a second rendering result;
- fuse the second rendering result and the first rendering result to generate a fused rendering result; and
- send the fused rendering result to the at least one asset user.

5. The cloud data center according to claim 1, wherein the payment success information records identification information of the first graphic asset, wherein the rendering request carries the identification information of the first graphic asset, and wherein the rendering device is further configured to request, from the cloud management platform, a graphic asset corresponding to the identification information carried in the rendering request.

6. The cloud data center according to claim 1, wherein the cloud management platform is further configured to:
- receive the first graphic asset and a reduced-fidelity three-dimensional version of the first graphic asset from the at least one of the plurality of off-cloud asset providers;
- receive a preview request that is for the first graphic asset and that is from the at least one asset user; and
- send the reduced-fidelity three-dimensional version of the first graphic asset to the at least one asset user for local rendering as a preview of the first graphic asset.

7. The cloud data center according to claim 1, wherein the first graphic asset is a graphic model, and wherein the graphic model comprises geometry information, material information, and texture information.

8. The cloud data center according to claim 1, wherein the first graphic asset is a graphic scenario, and wherein the graphic scenario comprises at least one of a graphic model, light source information, or camera information.

9. The cloud data center according to claim 1, wherein the cloud management platform is further configured to:
- record, based on the payment success information, a binding relationship between a user identity of the at least one asset user and an asset identity of the first graphic asset, wherein the binding relationship corresponds to a use permission validity period associated with the payment success information; and
- deny the rendering device access to the first graphic asset upon expiration of the use permission validity period by deleting the binding relationship between the user identity and the asset identity.

10. A method applied to a cloud management platform disposed in a cloud data center, wherein the method comprises:
- providing a login interface for a plurality of off-cloud asset providers and a plurality of off-cloud asset users to remotely log in to the cloud management platform using different accounts;
- storing a preset third-party graphic asset;

receiving a first graphic asset from at least one of the plurality of off-cloud asset providers;

setting the first graphic asset to be tradable;

obtaining introduction information of the first graphic asset;

setting a price for the first graphic asset;

publicly displaying the introduction information and the price on at least one publicly accessible webpage;

receiving payment success information of at least one asset user of the plurality of off-cloud asset users for the first graphic asset;

recording, based on the payment success information, that the at least one asset user has permission to use the first graphic asset;

receiving, from a rendering device comprising one or more processors disposed in the cloud data center in response to a rendering request that is for the first graphic asset and the preset third-party graphic asset and that is from the at least one asset user, an obtaining request for the first graphic asset and the preset third-party graphic asset; and sending, when the at least one asset user has permission to use the first graphic asset, the first graphic asset and the preset third-party graphic asset to the rendering device for rendering the first graphic asset to generate a first rendering result based on the first graphic asset and the preset third-party graphic asset, wherein the first graphic asset and the preset third-party graphic asset are not transmitted to the at least one asset user during or after the rendering of the first graphic asset and the preset third-party graphic asset.

11. The method according to claim 10, wherein the payment success information records identification information of the first graphic asset, wherein the obtaining request for the first graphic asset carries the identification information, and wherein sending the first graphic asset to the rendering device comprises sending a graphic asset corresponding to the identification information to the rendering device.

12. The method according to claim 10, further comprising:

receiving the first graphic asset and a reduced-fidelity three-dimensional version of the first graphic asset that are from the at least one of the plurality of off-cloud asset providers;

receiving, from the at least one asset user, a preview request that is for the first graphic asset; and sending the reduced-fidelity three-dimensional version of the first graphic asset to the at least one asset user for local rendering as a preview of the first graphic asset.

13. The method according to claim 10, wherein the first graphic asset is a graphic model, and wherein the graphic model comprises geometry information, material information, and texture information.

14. The method according to claim 10, wherein the first graphic asset is a graphic scenario, and wherein the graphic scenario comprises at least one of a graphic model, light source information, or camera information.

15. A cloud management platform disposed in a cloud data center, wherein the cloud management platform comprises:

a memory configured to store instructions; and one or more processors coupled to the memory and configured to execute the instructions to cause the cloud management platform to:

provide a login interface for a plurality of off-cloud asset providers and a plurality of off-cloud asset users to remotely log in to the cloud management platform using different accounts;

store a preset third-party graphic asset;

receive a first graphic asset from at least one of the plurality of off-cloud asset providers;

set the first graphic asset to be tradable;

obtain introduction information of the first graphic asset;

set a price for the first graphic asset;

publicly display the introduction information and the price on at least one publicly accessible webpage;

receive payment success information of at least one asset user of the plurality of off-cloud asset users for the first graphic asset;

record, based on the payment success information, that the at least one asset user has permission to use the first graphic asset;

receive, from a rendering device comprising one or more processors disposed in the cloud data center in response to a rendering request that is for the first graphic asset and the preset third-party graphic asset and that is from the at least one asset user, an obtaining request for the first graphic asset and the preset third-party graphic asset; and send, when the at least one asset user has permission to use the first graphic asset, the first graphic asset to the rendering device for rendering the first graphic asset and the preset third-party graphic asset to generate a first rendering result, wherein the first graphic asset and the preset third-party graphic asset are not transmitted to the at least one asset user during or after the rendering of the first graphic asset and the preset third-party graphic asset.

16. The cloud management platform according to claim 15, wherein the payment success information records identification information of the first graphic asset, wherein the obtaining request for the first graphic asset carries the identification information, and wherein the cloud management platform is further configured to send a graphic asset corresponding to the identification information to the rendering device.

17. The cloud management platform according to claim 15, wherein the cloud management platform is further configured to:

receive the first graphic asset and a reduced-fidelity three-dimensional version of the first graphic asset that are from the at least one of the plurality of off-cloud asset providers;

receive, from the at least one asset user, a preview request that is for the first graphic asset; and send the reduced-fidelity three-dimensional version of the first graphic asset to the at least one asset user for local rendering as a preview of the first graphic asset.

18. The cloud management platform according to claim 15, wherein the first graphic asset is a graphic model, and wherein the graphic model comprises geometry information, material information, and texture information.

19. The cloud management platform according to claim 15, wherein the first graphic asset is a graphic scenario, and wherein the graphic scenario comprises at least one of a graphic model, light source information, or camera information.

20. The cloud management platform according to claim 15, wherein the cloud management platform is further configured to:

record, based on the payment success information, a binding relationship between a user identity of the at least one asset user and an asset identity of the first graphic asset, wherein the binding relationship corresponds to a use permission validity period associated with the payment success information; and deny the rendering device access to the first graphic asset upon expiration of the use permission validity period by deleting the binding relationship between the user identity and the asset identity.

* * * * *